(12) United States Patent  
Franklin et al.

(10) Patent No.: US 8,020,260 B2  
(45) Date of Patent: Sep. 20, 2011

(54) LOCKING CLIP FOR A BILLBOARD SIGN TENSIONING SYSTEM

(75) Inventors: Robert Lee Franklin, Snellville, GA (US); Christopher Jonathan Adams, Hoschton, GA (US); John Dove Gibb, Buford, GA (US)

(73) Assignee: Formetco, Inc., Duluth, GA (US)

( * ) Notice: Subject to any disclaimer, the term of this patent is extended or adjusted under 35 U.S.C. 154(b) by 437 days.

(21) Appl. No.: 12/246,167

(22) Filed: Oct. 6, 2008

(65) Prior Publication Data

US 2009/0038124 A1 Feb. 12, 2009

Related U.S. Application Data

(63) Continuation-in-part of application No. 12/104,257, filed on Apr. 16, 2008, now Pat. No. 7,836,562, application No. 12/246,167, which is a continuation-in-part of application No. 12/174,449, filed on Jul. 16, 2008.

(60) Provisional application No. 60/912,058, filed on Apr. 16, 2007, provisional application No. 60/950,025, filed on Jul. 16, 2007.

(51) Int. Cl.  
*F16B 2/00* (2006.01)

(52) U.S. Cl. .............. 24/346; 24/349; 24/459; 40/603

(58) Field of Classification Search ............ 24/459, 24/460, 477, 194, 171, 346, 347, 349; 40/603  
See application file for complete search history.

(56) References Cited

U.S. PATENT DOCUMENTS

| | | |
|---|---|---|
| 1,474,692 A | 11/1923 | Thurau |
| 2,866,249 A | 12/1958 | Normandin |
| 4,686,748 A | 8/1987 | Kaivanto |
| 4,809,408 A | 3/1989 | Abrahamson |
| 5,003,716 A | 4/1991 | Dyar |
| 5,178,306 A | 1/1993 | Petrou |
| 5,467,546 A | 11/1995 | Kovalak, Jr. |
| 6,339,889 B1 | 1/2002 | Griesemer et al. |
| 6,789,295 B1 | 9/2004 | Svensson |
| 6,991,693 B2 | 1/2006 | Wylie et al. |
| 7,168,197 B2 | 1/2007 | Siegenthaler |
| 7,836,562 B2 * | 11/2010 | Franklin et al. ............ 24/346 |

FOREIGN PATENT DOCUMENTS

| | | |
|---|---|---|
| GB | 2215766 A | 9/1989 |
| JP | 06094010 | 4/1994 |
| WO | 03098055 A1 | 11/2003 |

OTHER PUBLICATIONS

U.S. Appl. No. 60/912,058, filed Apr. 16, 2007.

(Continued)

*Primary Examiner* — James Brittain  
(74) *Attorney, Agent, or Firm* — Jason A. Bernstein; Barnes & Thornburg LLP

(57) ABSTRACT

A locking clip for a cable tensioning system, comprising (i) a base plate having a top surface having a gripping portion, tensioning arms extending from the top surface, a cable retaining arm and posts extending from the bottom surface, and, at least one slot in the base plate; and, (ii) a tapering top member including a cable tensioning hook with a channel and extending from the top surface, and at least one nub extending from the bottom surface to slidingly engage the slot. The clip can hold a portion of a sheet between the base plate and the top member when the top member and the base plate are in an engaged relationship. The cable tensioning arm holds the cable and allows tension to be placed on the sheet. When the clip is disengaged from the sheet it can be temporarily attached to the cable by the cable retaining arm.

14 Claims, 19 Drawing Sheets

OTHER PUBLICATIONS

Search Report and Written Opinion for International Patent Application No. PCT/US2008/060505; Aug. 13, 2008.

Search Report and Written Opinion for International Patent Application No. PCT/US2008/070197; Oct. 22, 2008.

* cited by examiner

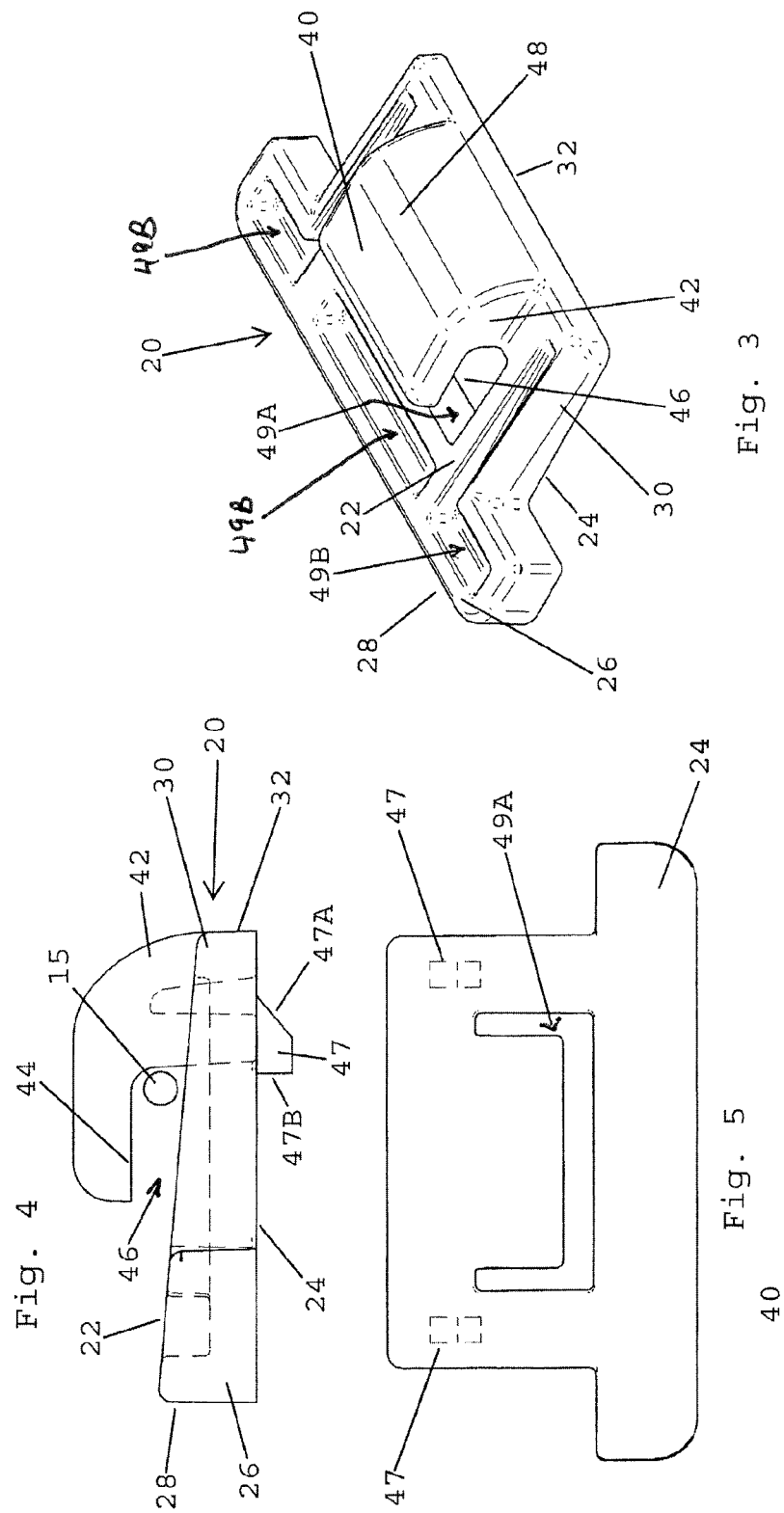

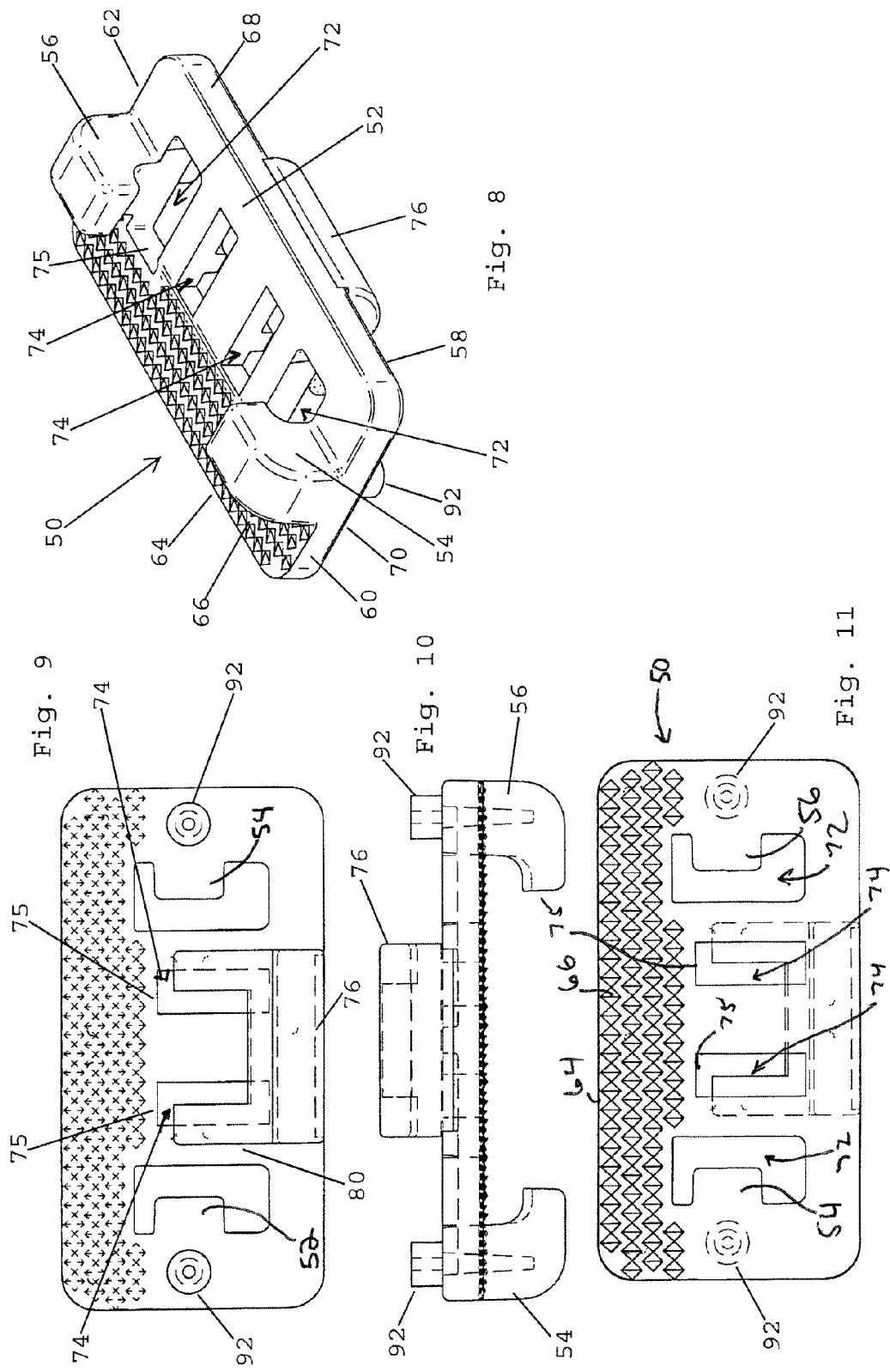

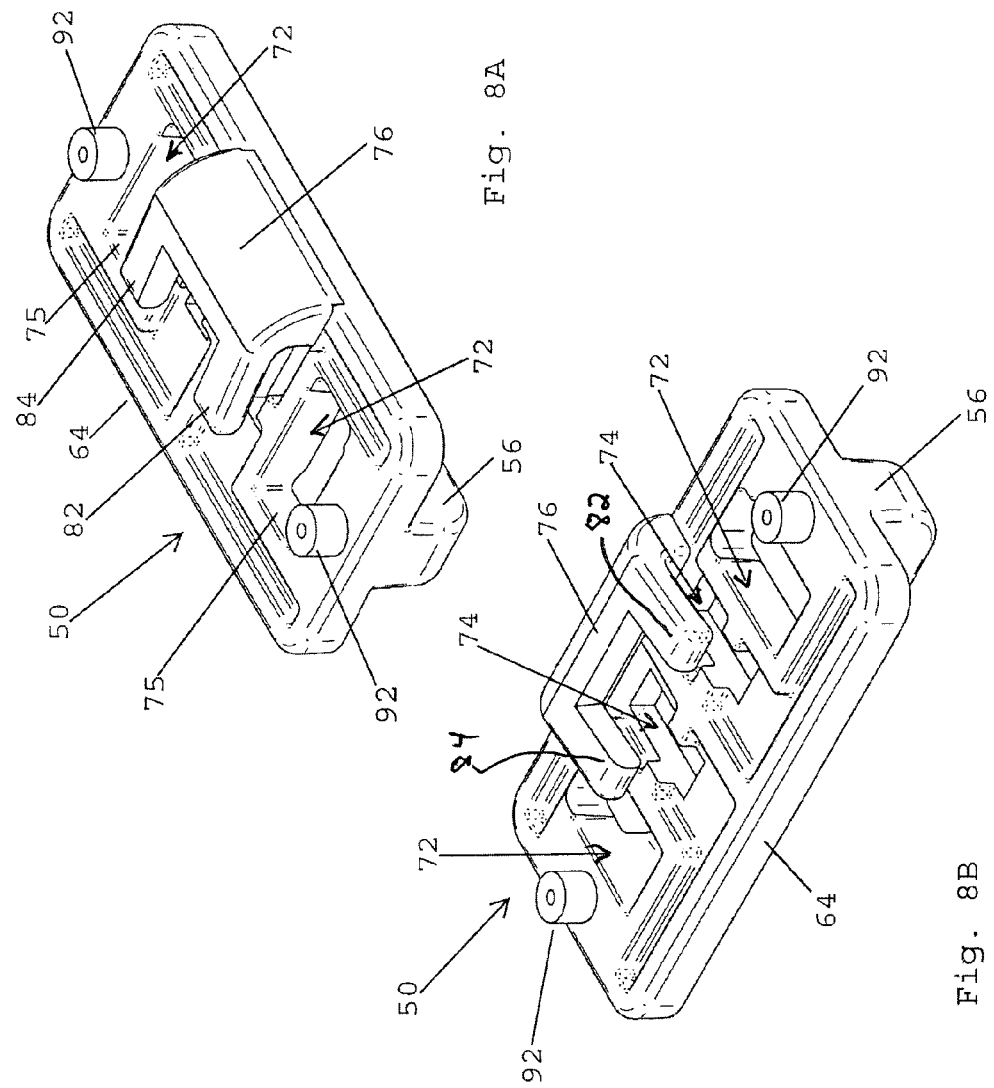

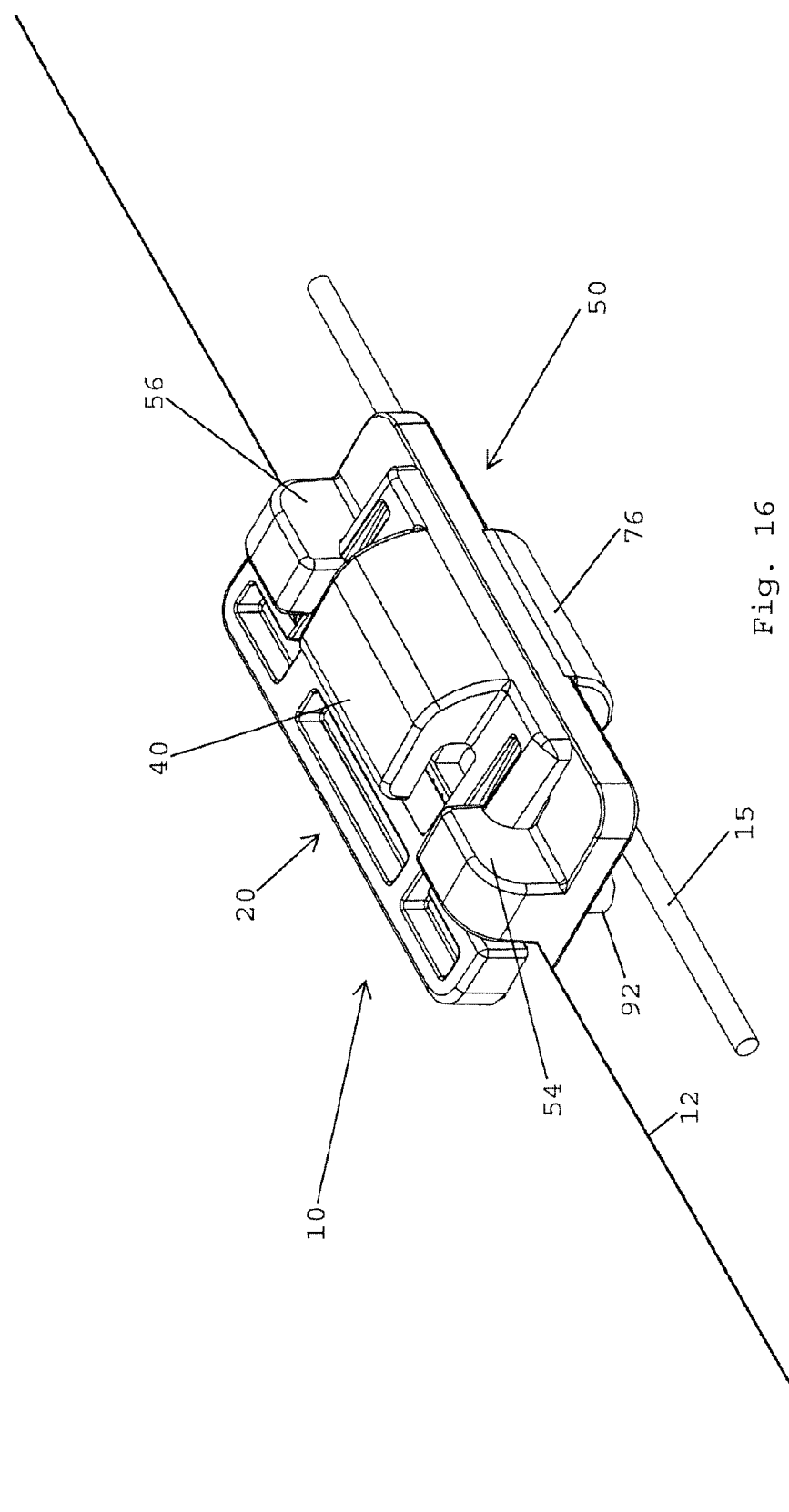

LOCKING CLIP FOR A BILLBOARD SIGN TENSIONING SYSTEM

CROSS-REFERENCE TO RELATED APPLICATIONS

This patent application is a continuation-in-part of co-pending U.S. application Ser. No. 12/104,257, filed Apr. 16, 2008, which is a nonprovisional application of provisional Application No. 60/912,058, filed Apr. 16, 2007, and U.S. application Ser. No. 12/174,449, filed Jul. 16, 2008, which is a nonprovisional application of provisional Application No. 60/950,025, filed Jul. 16, 2007, all of which are commonly assigned to the assignee of the present application and the disclosures of which are incorporated herein by reference in their entirety.

FIELD

The present disclosure relates to locking clips for holding and maintaining a generally flat sheet of material in a tensioned or stretched condition on a billboard using a cable framework upon which to mount the sheet.

BACKGROUND

Large printed vinyl sheets have generally replaced pasted paper signs in the outdoor advertising industry. Installation of large printed vinyl sheets requires two or more workers who push light weight fiberglass or similar non-conductive rods through pockets heat-sealed in each of the four end surfaces of a sheet, which forms the advertising face of a billboard.

The vinyl sheets typically have to be hung down from the top of a billboard after the top rods are secured to the billboard frame and pulled or tensioned horizontally and vertically across the metal backing of the billboard. Various tensioning devices have been used and generally require at least two workers to complete the installation process, taking on average approximately 20 to 30 minutes or more from beginning to end.

The industry recently developed light weight vinyl sheets which cost less but are not as strong as the vinyl in predominate use today. Its lighter weight and lesser strength make it unsuitable for heat-sealing pockets and more subject to tearing from excess tensioning and repeated installations and removal. Printed vinyl sheets are frequently moved from one billboard location to another to save on printing and material costs.

U.S. Pat. No. 6,789,295 discloses a clamp apparatus for application to a plate, sheet, fabric or thin film by gripping two opposite sides of the object. Additionally, the only accommodation for a cable connection will place this apparatus at a 90 degree angle to the face of a billboard panel, which may result in twisting and wrinkling of the vinyl sheet.

It would be desirable to have a clip which could attach to a laterally running cable and which will minimize or eliminate twisting and wrinkling of the vinyl sheet. It would be further desirable to have a clip which would allow application to a cable running parallel to the face of the clip. It would be further desirable to have a clip that could be retained on the cable when a sheet is being dismounted, remounted or when the clip is not in use so that the clip is not dropped or lost. It would be further desirable to have a two-piece clip which will allow for limited movement of the two pieces with respect to each other when a sheet is unattached from the clip yet prevent complete separation of the two pieces.

SUMMARY

The present disclosure provides a clip for use in a cable tensioning system. One aspect of the present disclosure provides a clip having (a) a base plate comprising a generally flat base member having a top surface comprising a front portion having a gripping surface and a rear portion, a pair of opposing first retaining arms extending upward from the top surface, each first arm having an angled portion angled toward the other arm, the first retaining arms capable of engaging the top member, a bottom surface having a hook extending therefrom, the hook having a channel defined therein capable of receiving a portion of a cable, a front edge and a rear edge, and at least one slot formed in the base member; and, (b) a top member comprising a top surface having a hook extending upward therefrom, the hook and the top surface defining a channel capable of receiving a portion of a cable, a bottom surface having at least one nub protruding therefrom, the nub being capable of being received at least partially within the base member slot, and, a front portion and front edge and a rear portion and rear edge, the front portion being wider than the rear portion.

BRIEF DESCRIPTION OF THE DRAWINGS

Exemplary embodiments of the present invention are illustrated in the drawings in which like reference characters designate the same or similar parts throughout the figures of which:

FIG. 3 is a perspective view of one exemplary embodiment of the top member.

FIG. 4 is a side elevation view of the top member of FIG. 3.

FIG. 5 is a bottom plan view of the top member of FIG. 3.

FIG. 6 is a rear elevation view of the top member of FIG. 3.

FIG. 8 is a top perspective view of one exemplary embodiment of the base plate.

FIG. 8A is a first bottom perspective view of the base plate of FIG. 8.

FIG. 8B is a second bottom perspective view of the base plate of FIG. 8.

FIG. 9 is a bottom plan view of the base plate of FIG. 8.

FIG. 10 is an inverted front elevation view of the base plate of FIG. 8.

FIG. 11 is a top plan view of the base plate of FIG. 8.

FIG. 16 is a schematic perspective view of the clip with the cable passing through the channel in the base plate and holding a sheet under tension.

DETAILED DESCRIPTION

The present disclosure relates to a locking clip for a conventional cable tensioning system. In a typical installation, a cable is hung on slides along the four sides of a billboard face, hidden from view by the face frame. A number of clips are attached to the vinyl sheet at selected intervals approximately 2-3 feet apart. The clips releasably hold a portion of the sheet under tension. The clip has a lip or hook with a channel or guideway through which a portion of the cable passes. For the purposes of the present disclosure the cable may refer to a portion of the cable, as the context reflects. As tension is increased on the cable by means of a spring-loaded dual arm locking mechanism, the grip of the clip on the vinyl sheet is increased. An example of a cable tensioning system is disclosed in co-pending PCT patent application No. PCT/US2008/060505, commonly assigned to the assignee of the present application and the disclosure of which is incorporated by reference in its entirety.

Figure 1:
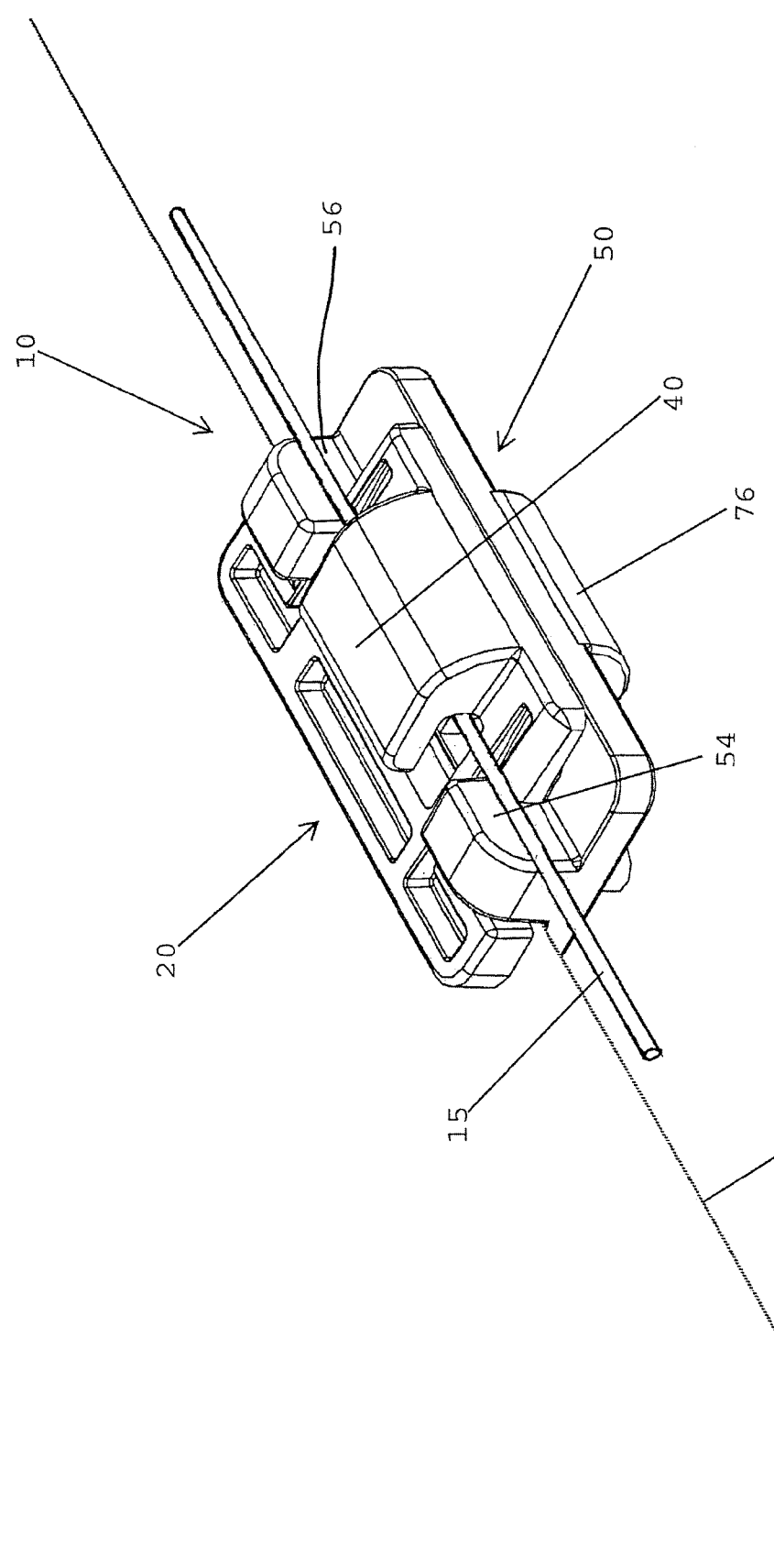
FIG. 1 is a perspective view of a locking clip according to one exemplary embodiment shown engaging a sheet and cable.

FIG. 1 illustrates one exemplary embodiment of the present disclosure and shows an assembled clip 10 engaging a sheet 12 and a portion of a cable 15. The clip 10 generally comprises a cable top member 20 and a base plate member 50. The clip parts may be made of a composite nylon material which provides the strength required to sustain constant tensioning pressure and withstand long-term outdoor exposure to heat, cold, sun, rain, and non-atmospheric conditions such as excessive installation pressure, tensioning pressure, and corrosive elements. Alternatively, the clip may be made of other suitable polymers, plastic, metal, alloy, ceramic, wood, combinations and mixtures thereof, and the like. The top member 20 and base plate 50 may be made of the same or different materials.

Figure 2:
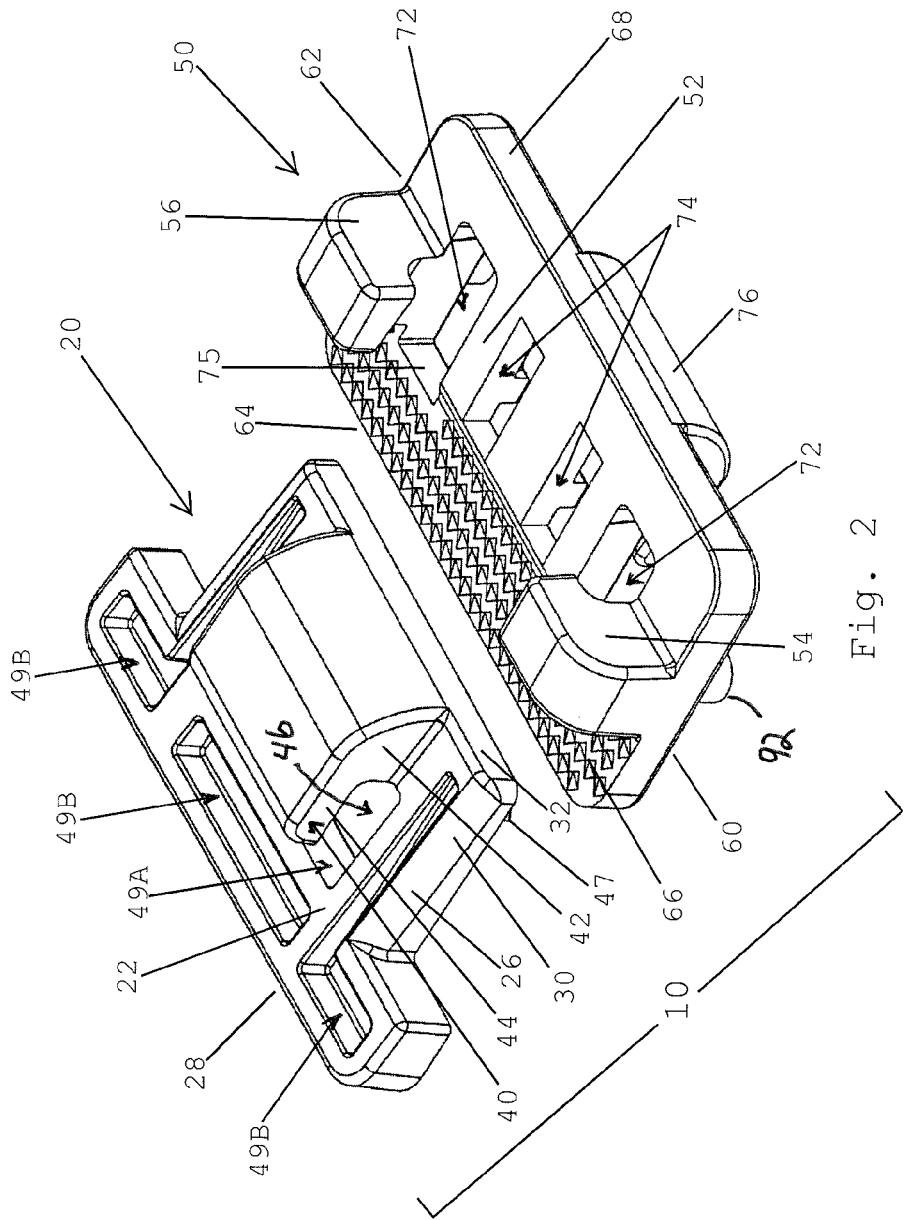
FIG. 2 is an exploded perspective view showing the top member and base plate of FIG. 1 aligned for assembly.
Figure 3A:
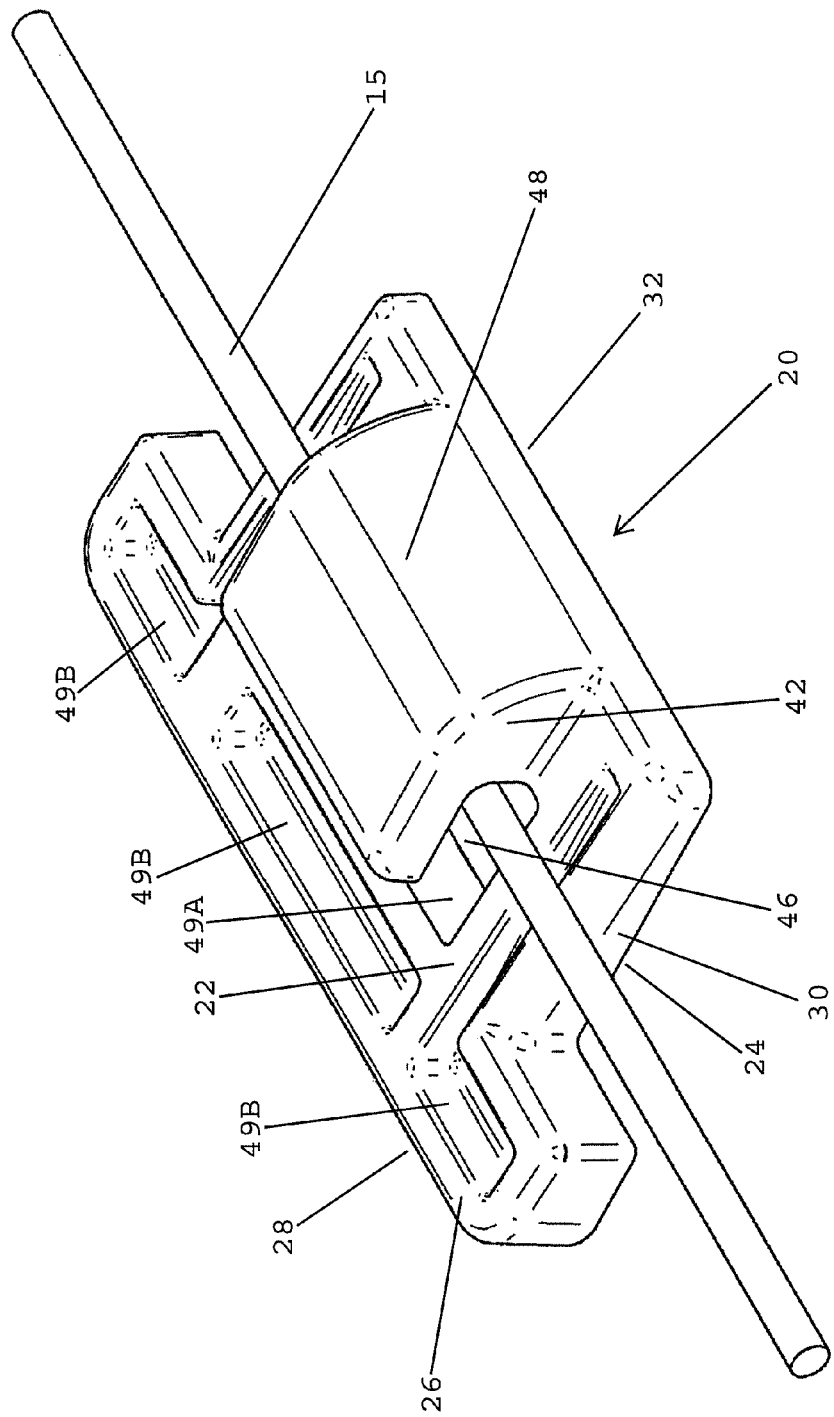
FIG. 3A is a perspective view of the top member of FIG. 3 shown attached to a cable.
Figure 4A:
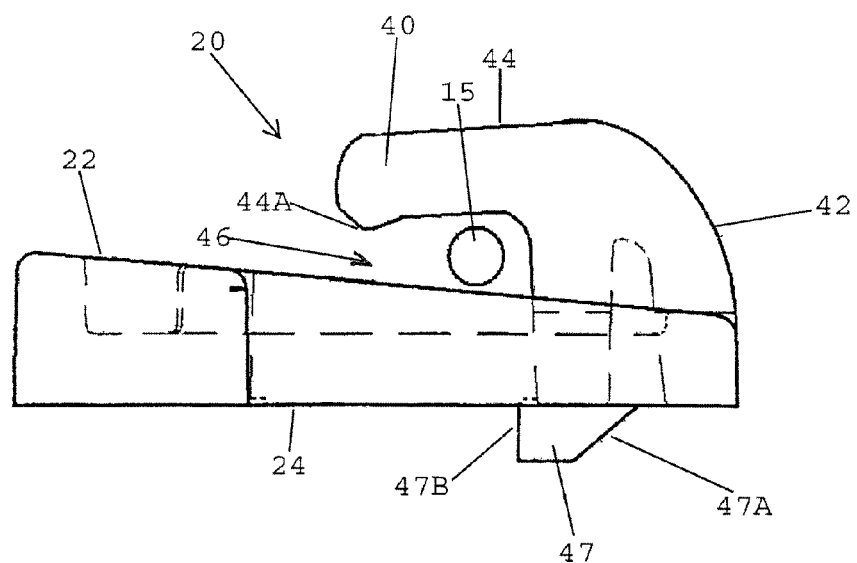
FIG. 4A is a side elevation view of a variation of the top member of FIG. 3 having a bump at the distal end of the hook.

FIG. 2 shows the cable top member 20 separated from the base plate member 50. FIGS. 3-6 show details of the top member 20. The top member has a top surface 22, a bottom surface 24, a front portion 26 having a front edge 28, and a rear portion 30 having a rear edge 32. A cable lip or hook 40 extends upward from the top surface 22. The hook 40 has a generally vertical post portion 42 and a generally horizontal surface 44. The generally horizontal surface 44 is preferably angled slightly downward towards the top surface 22 so that the distance between the distal end of the horizontal portion 44 and the top surface 22 is slightly smaller than the diameter of the cable 15, preventing the cable 15 from inadvertently disengaging from the hook 40. The hook portions 42 and 44 have an interior surface which defines a channel or guideway 46 which can receive a portion of a cable 15, as described in greater detail hereinbelow. In an alternative embodiment, shown in FIG. 4A, the end of the horizontal portion 44A may have a semi-circular nub 44A extending downward toward the top surface 22. The nub 44A assists in retaining the cable 15 once the top member 20 has been attached to the cable 15. Another alternative embodiment utilizes a spring-loaded hook 40 to capture the cable 15 and prevents the top member 20 from disengaging from the cable 15 while the position of the sheet 12 is being removed or otherwise manipulated. A spring-loaded hook 40, or a lip that has a portion that has a greater degree of flexion can permit a user to open the gap between the hook 40 opening and the top surface 22 so as to insert the cable 15.

At least one, and, preferably, a plurality of nubs 47 project from the bottom surface 24 (see FIGS. 4-6). The nubs 47 may have a beveled front edge 47A and a generally vertical rear edge 47B. Alternatively, the nubs 47 can be bumps, posts, flexible rods, fingers, or the like.

Figure 7:
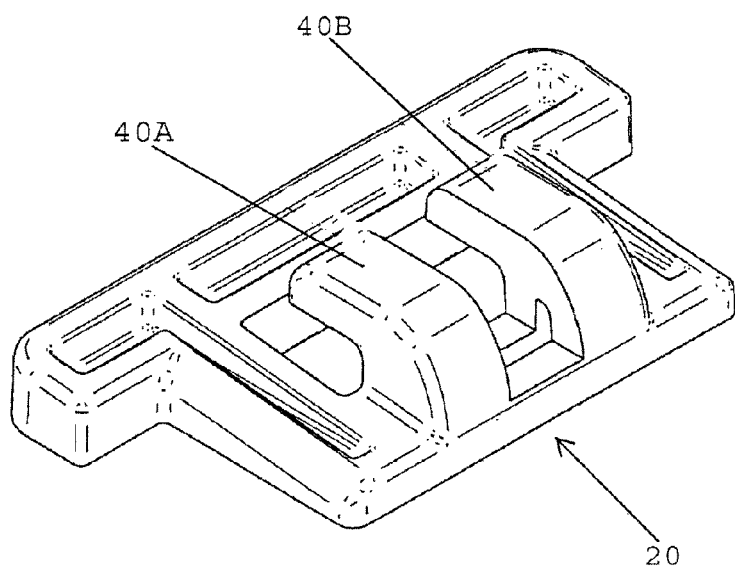
FIG. 7 is perspective view of an alternative embodiment of the top member showing the hook as a pair of hooks.

In an alternative embodiment, shown in FIG. 7, the hook 40 can comprise a plurality of spaced apart narrower fingers 40A, 40B, each finger generally shaped like the hook 40 (though narrower in width). While two such fingers 40A, 40B are shown, more fingers may be used.

As shown in FIG. 4, the thickness of the top member 20 preferably tapers from the front portion 26 toward the rear portion 30. The tapering may be from the front edge 28 to the rear edge 32, or, alternatively, the tapering can be a portion of the distance from edge to edge. The tapering allows the cable 15 to slide within the hook 40 and facilitates the gripping and locking functions when the top member 20 is engaged with the base plate 50. Alternatively, rather than tapering, the top member 20 may have a curved portion. Free or substantially unimpeded lateral movement of the cable 15 within the channel 46 is preferable for smooth operation of the cable tensioning system. Alternatively, for certain applications the hook 40 and channel 46 may form a snug fit over the cable 15.

Optionally, the top member 20 may optionally have one or more open or reduced thickness areas 49A and 49B which reduce the amount of material needed and the weight of the part. The areas 49A and 49B may be recessed areas extending from the surface partially toward the opposing surface, or, may be from one surface through to the other surface.

Figure 7A:
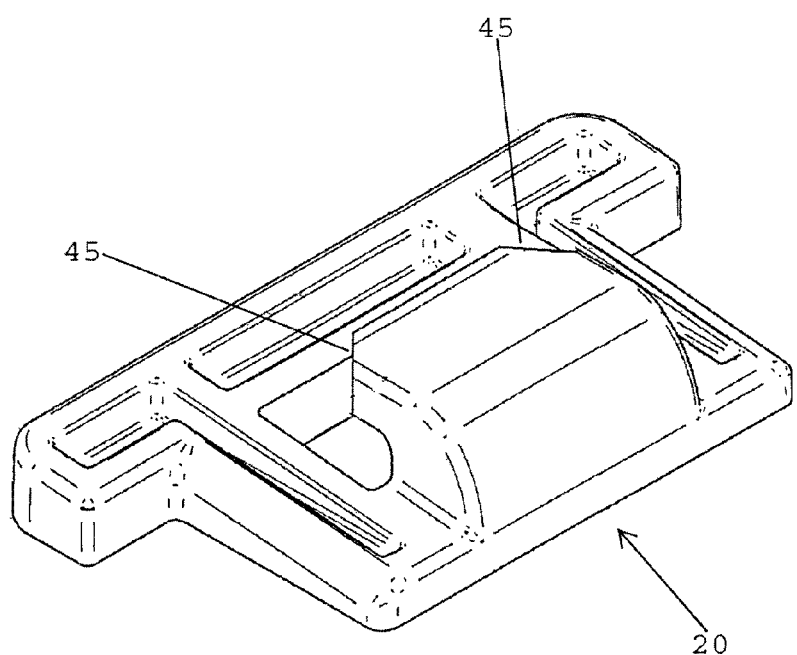
FIG. 7A is a perspective view of a further alternative embodiment of the top member in which the leading edges of the hook are beveled.
Figure 8C:
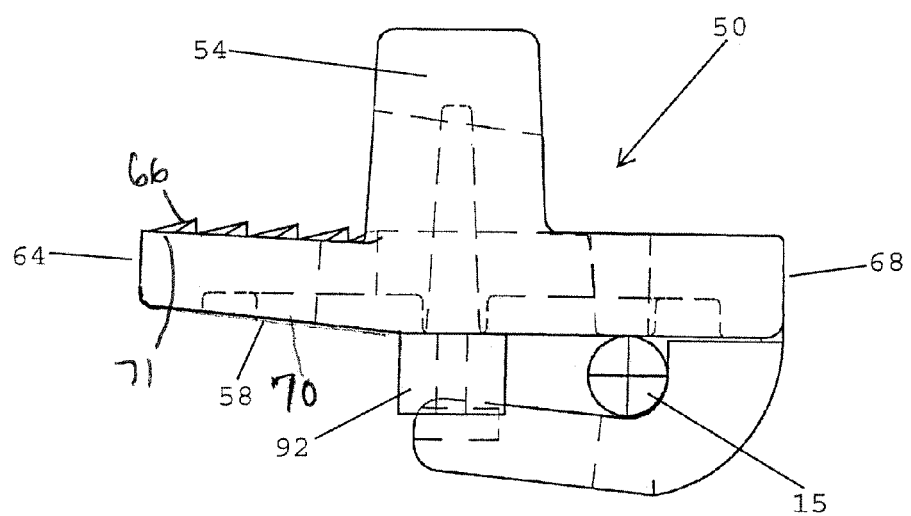
FIG. 8C is a perspective view of the base plate in an alternative embodiment showing a portion of the bottom surface and top surface being angle upward.

In a variation of this embodiment (shown in FIG. 7A) the corners 45 of the hook 40 are angled or beveled, preferably at about 45 degrees (although other angles are usable), to facilitate the attachment of the assembled clip apparatus 10 to the cable 15.

FIGS. 8-11 show the base plate 50 having a top surface 52 and two retaining arms 54, 56 extending upward from the base plate 50 and facing each other. The retaining arms 54, 56 (referred to as the "retaining arms 54, 56") provide a friction fit with the tapered top surface 22 of the top member 20. The base plate 50 has a bottom surface 58 and sides 60, 62. A portion of the top surface 52 (proximate to the front edge 64) preferably has a gripping surface, comprising a series of surface irregularities, such as protrusions 66 extending from the first side 60 to the second side 62 (or at least a portion thereof) to provide a friction fit against a portion of the bottom surface 24 of the top member 20 and to prevent premature separation of the top member 20 from the base plate 50, yet still permit separation by manually pushing or pulling the two parts apart. The protrusions 66 can be teeth, protrusions, bumps, ribs, ridges, spikes, or the like. Alternatively, the surface irregularities can be grooves, indentations, channels, detents, divots, or the like. Preferably, the protrusions 66 have a relatively sharp edge to engage a sheet 12 (shown in FIG. 14 and described hereinbelow in greater detail). The base plate 50 also has a rear edge 68. The bottom surface 58 may taper or angle upward at a portion 70 extending from the front edge 64 toward the rear edge 68 to increase the amount of pressure between the top member 20 and the base plate 50 when pressed together (see FIG. 8C; the angle of the taper 70 shown being exaggerated for easier viewing). The top surface 52 proximate to the front edge 64 may have a portion 71 which can be flat or, as shown in FIG. 8C, angled slightly upward.

The base plate 50 has at least one, and preferably a plurality of, recessed areas or slots 72. The slots 72 can slidingly accommodate the nubs 47. When the top member 20 is inserted through the retaining arms 54, 56 the beveled front edge 47A of the nub may deform slightly and pass into the slot 72. Reverse movement of the top member 20 causes the rear edge 47B of the nub 47 to hit against the wall 75 of the slot 72. The interaction of the nubs 47 and slots 72 allow limited movement of the nubs 47 within the slots 72 yet restrict the separation of the base plate from the top member until so desired.

Optionally, the base plate 50 may have recessed areas or openings 74, which reduce material and weight and also accommodate the manufacturing process of the base plate 50.

Figure 11A:
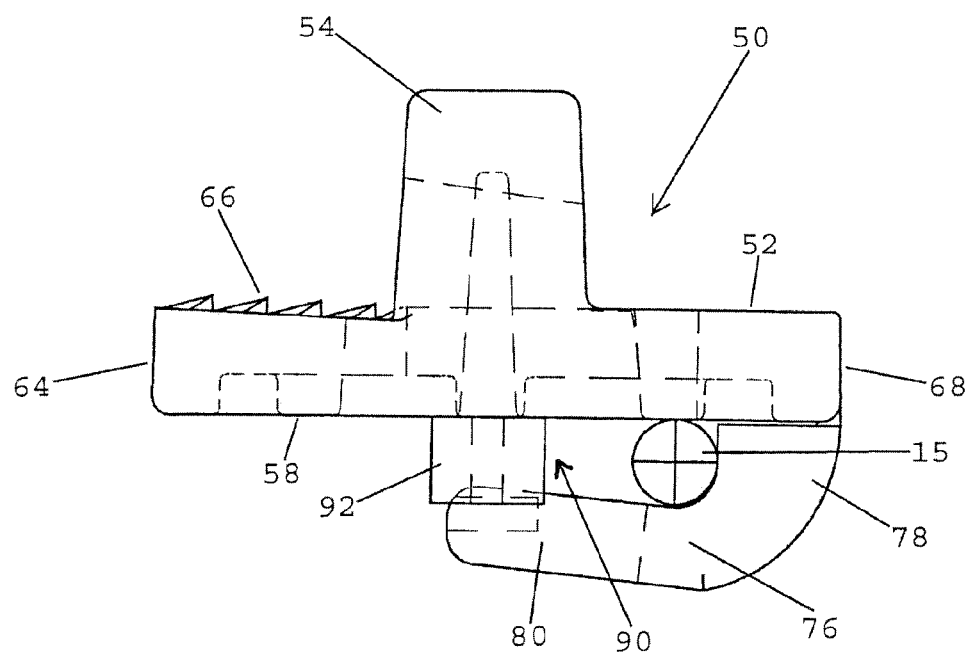
FIG. 11A is a side elevation view of the base plate of FIG. 8.
Figure 11B:
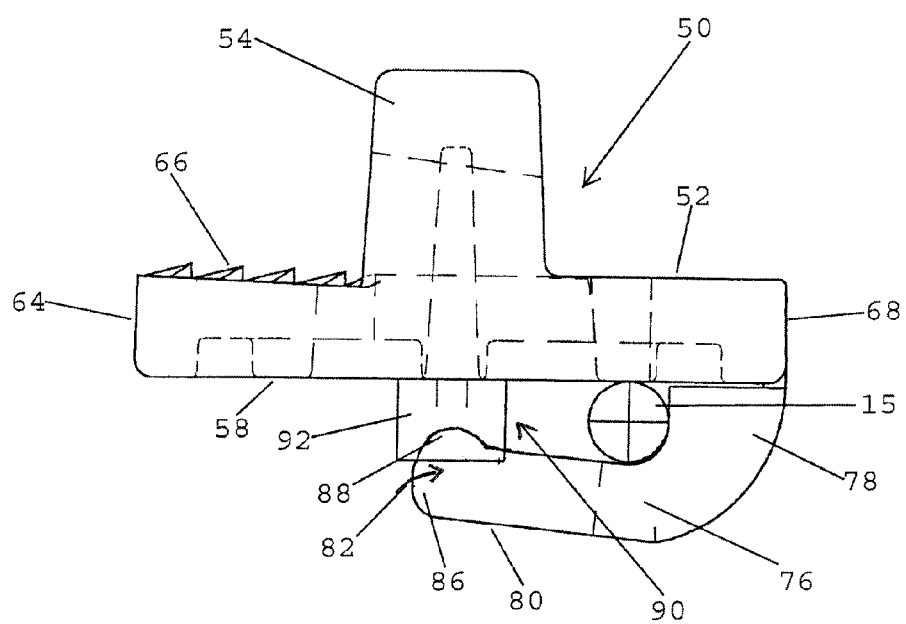
FIG. 11B is a side elevation view of a variation of the base plate of FIG. 8 having a bump at the distal end of the hook.

The hook 76 extends from the bottom surface 58 of the base plate 50 and has a vertical post portion 78 and a generally horizontal portion 80 (see FIG. 11A). In one exemplary configuration the horizontal portion 80 may be angled slightly with respect to the bottom surface 58. The horizontal portion 80 may comprise a pair (which alternatively may be just one, or may be more than two) of lips or hooks 82, 84 (see FIG. 8A). In an alternative exemplary structure, shown in FIG. 11B, the fingers 82, 84 may terminate at the distal end 86 in a bump 88. Viewed from the side, the cable hook 76 provides a guideway or channel 90 through which a portion of the cable 15 may pass.

The base plate 50 may optionally include at least one, and in one exemplary embodiment, a pair of posts 92 extending therefrom (see FIGS. 8A and 8B). The posts 92 can cooperate with the hook 76 to removably hold the base plate 50 on the cable 15, particularly, for example, when the clip 10 is disengaged from the sheet 12 and the cable tension is released, thereby keeping the clip 10 attached to the cable 15 while a sheet 12 is being removed or installed. Keeping a plurality of the clips 10 in approximately the same location around the cable framework for the billboard makes it easier for the operator to attach the clips to a replacement sheet 12.

Figure 12:
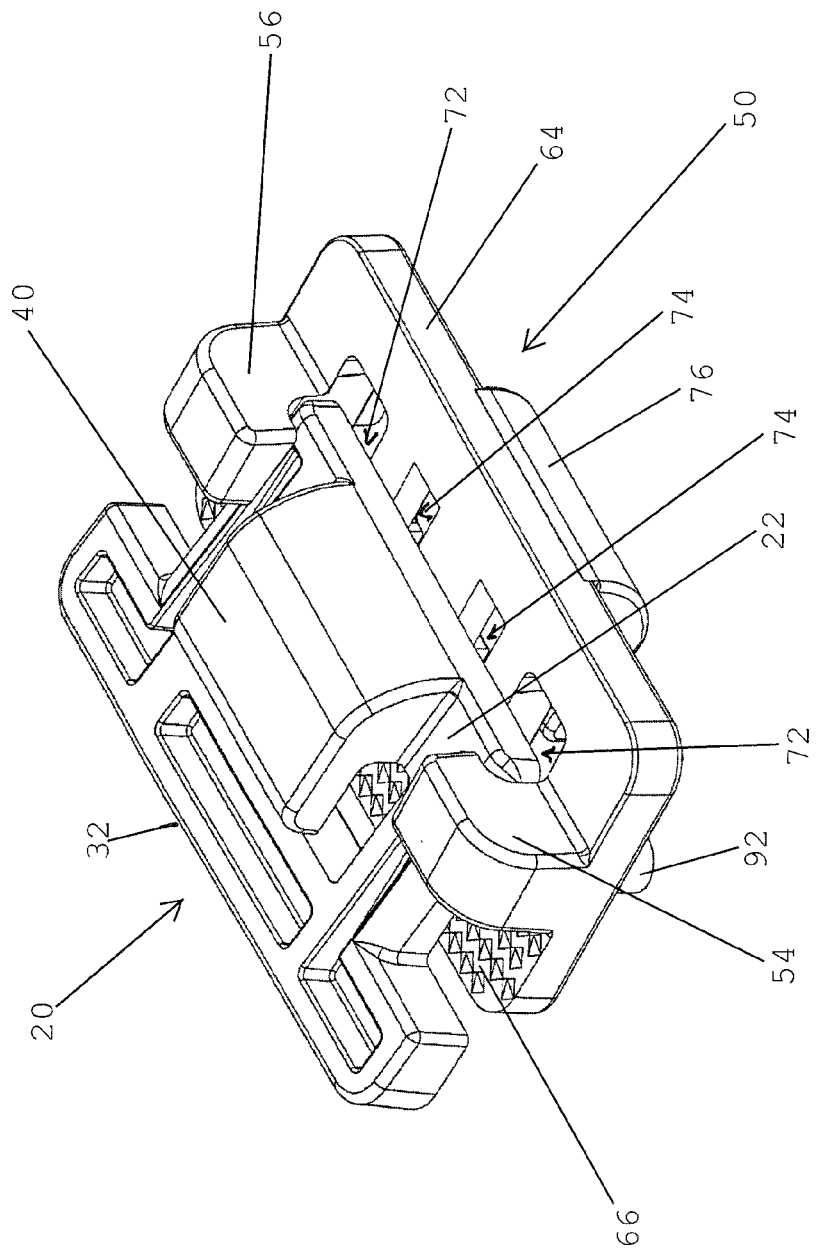
FIG. 12 is a perspective view of the clip of FIG. 1 shown with the top member partially inserted into the base plate.
Figure 13:
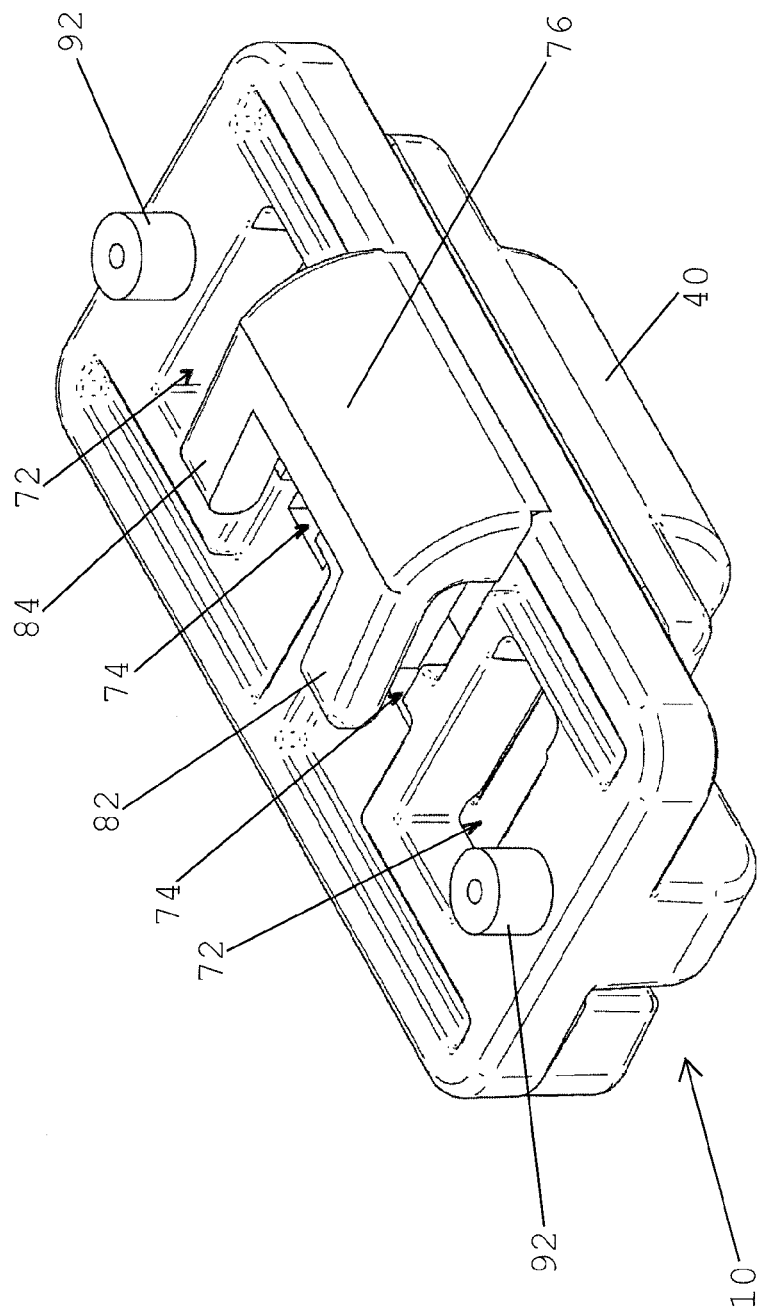
FIG. 13 is a bottom perspective view of an assembled clip of FIG. 1.
Figure 14:
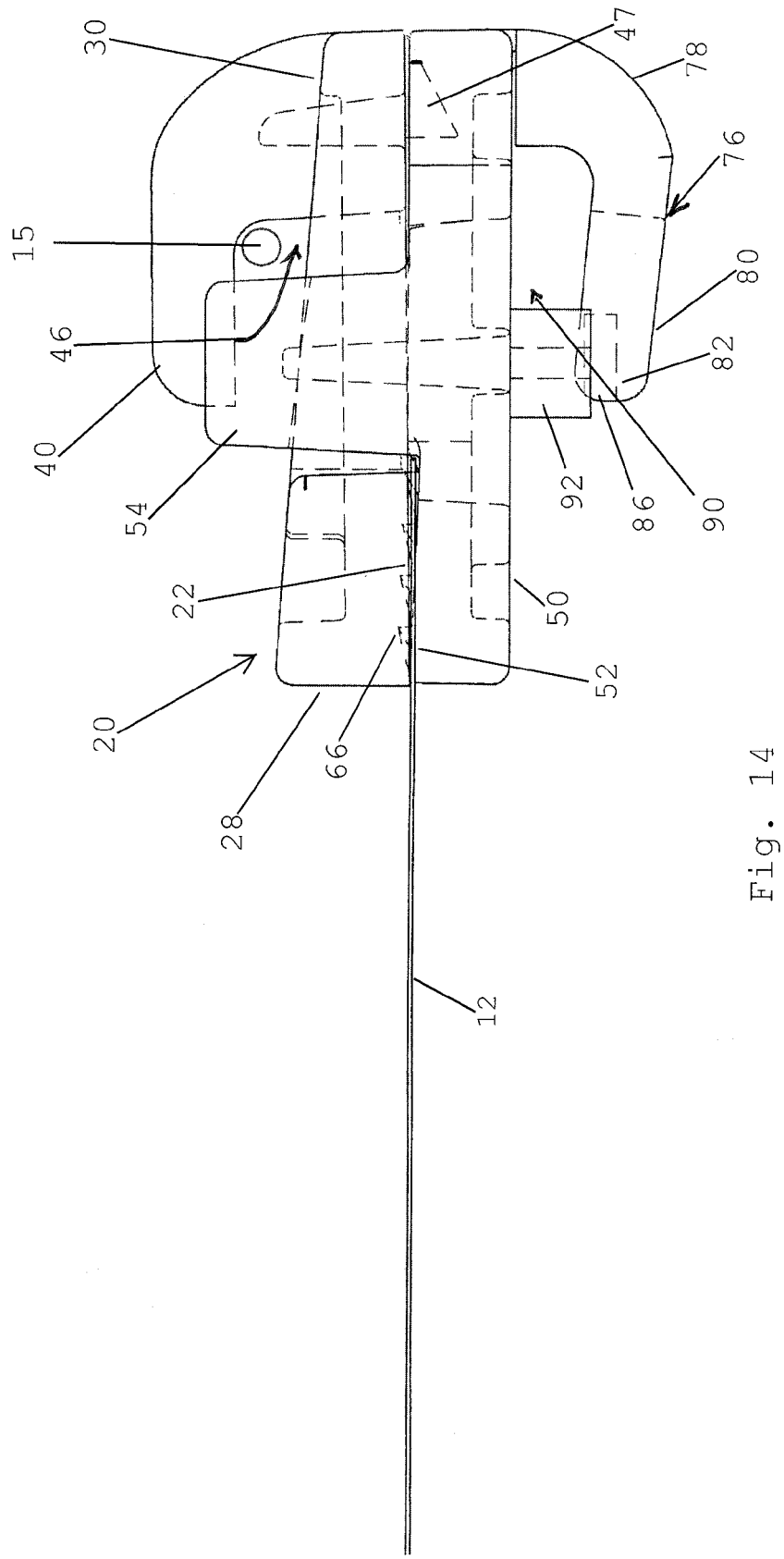
FIG. 14 is a side elevation schematic view of the assembled clip and sheet of FIG. 1.

The clip 10 in one exemplary embodiment is assembled and used as follows and as shown in FIGS. 1, 2, and 12-15. The hook 40 is slid over a portion of the cable 15 and the top member 20 and base plate 50 aligned for assembly (see FIG. 2). The rear edge 32 of the top member 20 is inserted between the base plate retaining arms 54, 56. FIG. 12 shows the top member 20 partially inserted into the base plate 50. The nubs 47 slide over the base plate top surface 52 until they drop into the slots 72. The fully assembled clip 10 is shown in FIGS. 13 and 14. FIG. 14 shows the position of the nub 47 in the slot 72. Prior to full insertion of the top member 20 into the base plate 50, the top surface 52 of the base plate 50 is slid under the sheet 12 and the bottom surface 22 of the top member 20 is slid on top of the sheet 12 so as to sandwich the sheet 12 between the top member 20 and base plate 50. The operator then applies opposing horizontal pressure to the top edge 32 of the top member 20 and the bottom edge 64 of the base plate 50 (or vice versa) to force them together, causing the protrusions 66 to partially engage the underside of the sheet 12 and clamp the clip 10 to the sheet 12. The tapered top surface 22 of the top member 20 is wedged in by the retaining arms 54, 56, thereby maintaining the clip 10 in position holding the sheet 12 between the top member 20 and the base plate 50.

Figure 15:
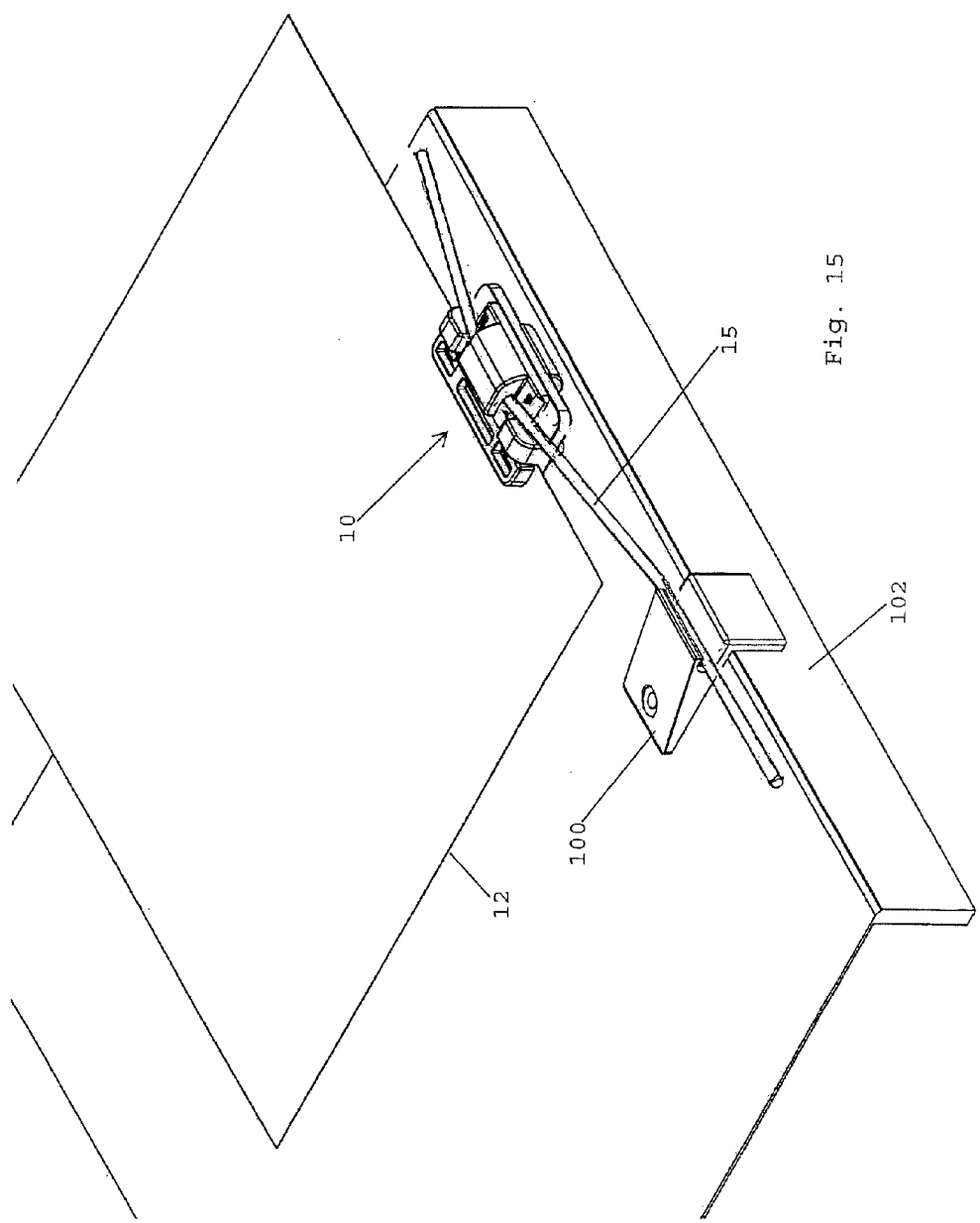
FIG. 15 is a schematic perspective view of the clip (and a guide clip) with the cable passing through the channel in the top member holding a sheet under tension in conjunction with a billboard.

The assembled clip, engaged with the stretched sheet 12 and the cable 15 is shown in FIGS. 1 and 15. FIG. 15 also shows a conventional guide clip 100 and a billboard frame 102, known to those skilled in the art. A number of clips 10 are assembled around the periphery of the billboard frame 102 retaining the cable 15 around the periphery with the sheet 12 attached to the clips 10. As tension is applied to the cable the sheet 12 is stretched across the face of the billboard frame 102 holding the sheet 12 flat with minimal or no twisting, wrinkling, or other distortion of the sheet 12.

Figure 14A:
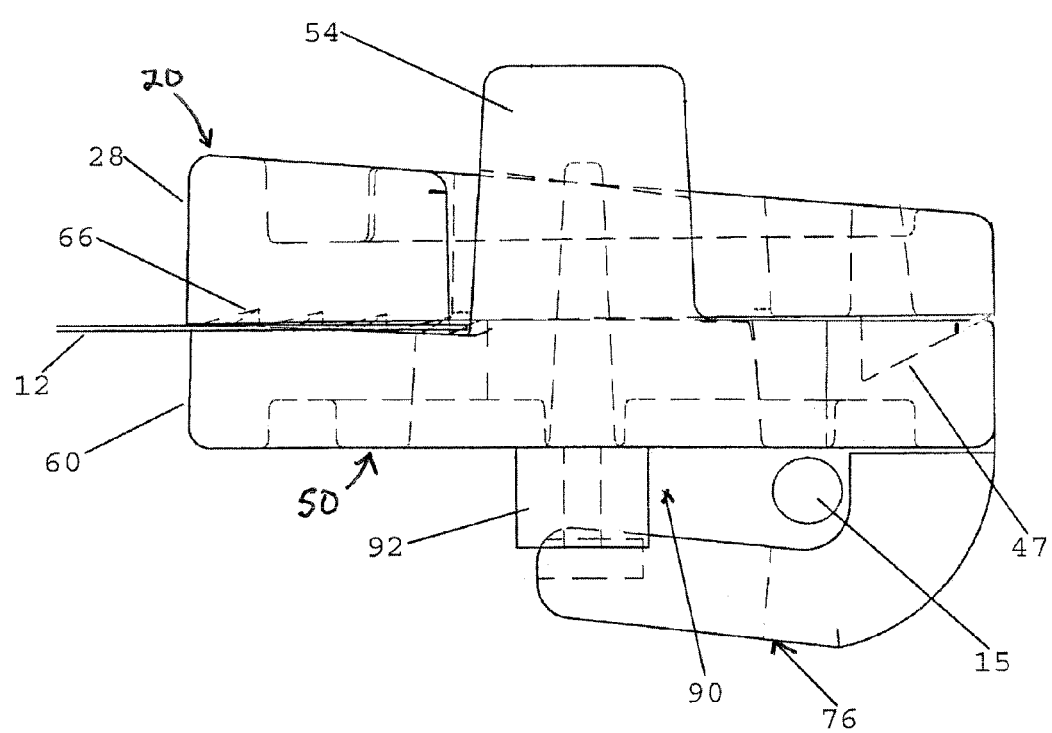
FIG. 14A is a side elevation view of an alternative exemplary embodiment of a clip having a base plate hook, but no top member hook.
Figure 14B:
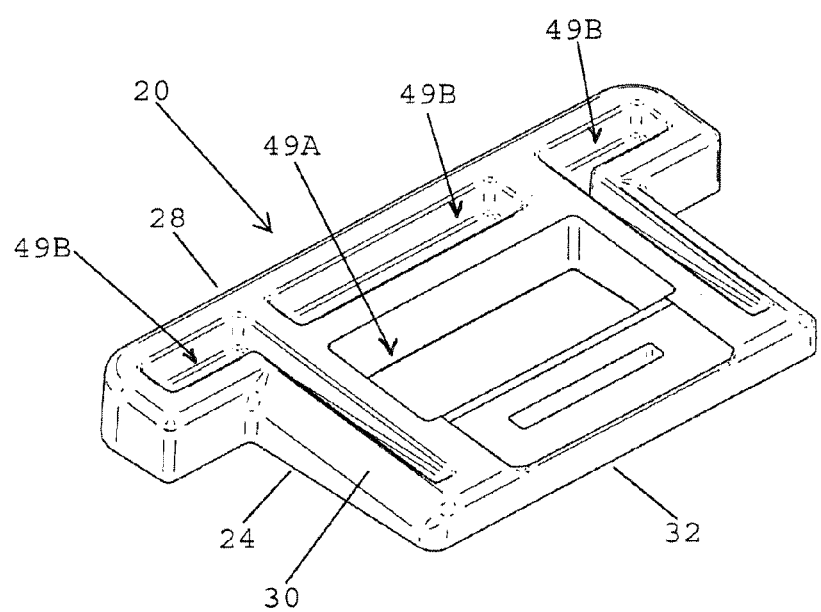
FIG. 14B is a perspective view of a top member according to the alternative exemplary embodiment of FIG. 14A.

The clip 10 gives the operator the option of attaching the clips 10 to a sheet 12 off-site in a weather-protected facility. After attaching the clips 10 to the sheet 12, the worker can transport the sheet 12 to the installation site where the clips 10 are attached to the cable 15 using the lip 40 or hook 76 on either the cable top member 20 or the base plate 50, respectively. Once a clip 10 is attached to the cable 15 using the hook 40 or 76, it is difficult to inadvertently separate the two clip parts, 20 and 50 because of the location of the cable 15 in relation to the hook 40 to the retaining arms 54, 56 without disengaging the clip 10 from the cable 15. Another optional installation, shown in FIG. 16 allows the operator to attach the clip 10 to the cable 15 using the hook 76 of the base plate 50. With the cable running along the back 58 of the cable plate, the cable top member 20 can be easily disengaged from the bottom plate 50. In an alternative embodiment, shown in FIG. 14A, the clip 10 has the top member 20 (shown in FIG. 14B) without the hook 40. The clip 10 can attach to the cable 15 solely with the hook 76 of the base plate 50.

When an operator needs to replace the sheet 12, the clip 10 parts are loosened by sliding the front edge 28 toward the main part of the sheet 12, which "unwedges" the top member 20 from between the retaining arms 54, 56 and allows the operator to remove the sheet 12. The nubs 47 slide within the slots 72 until they contact the wall 75, thereby preventing the clip 10 from separating completely into two parts. The clip 10 remains attached to the cable 15 and the operator can attach a replacement sheet 12 to the clip 10. In a similar fashion, if the cable 15 is engaged on the hook 76 and posts 92 on the base plate 50, the sheet 12 can be removed while maintaining the clip 10 on the cable 15.

A single operator can install the sheet 12 in comparison to conventional systems, which require several workers. The reduction in time to install the sheet represents a significant time and expense savings to the installation company.

It is to be understood that the locking clip 10 of the present disclosure can be used or adapted to be used with other types of systems or be used to grip any suitable type of surface, such as, but not limited to, tent fabric, paper, film, cotton or other natural or synthetic fiber (woven or nonwoven material), and the like. The clip of the present invention can be adapted to secure relatively inflexible surfaces (such as, but not limited to, metal sheeting, glass, plastic, wood, composites, ceramic, and the like) by incorporating a rubberized, nonslip, tacky or other friction-type surface on or as part of the engaging surfaces 22 and 52.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. It should further be noted that any patents, applications and publications referred to herein are incorporated by reference in their entirety.

All patents, patent applications and publications referred to herein are incorporated by reference in their entirety.

What is claimed is:

1. A clip usable in a cable tensioning system for engaging and removably retaining a portion of a sheet to be stretched, comprising:
   a. a base plate comprising
      i. a generally flat base member having
         1) a top surface comprising a front portion having a gripping surface and a rear portion,
         2) a pair of opposing first retaining arms extending upward from said top surface, each first arm having an angled portion angled toward the other arm,
         3) a bottom surface having a first hook extending therefrom, said first hook having a channel defined therein capable of receiving a portion of a cable,
         4) a front edge and a rear edge, and
         5) at least one slot formed in said base member; and,
   b. a top member comprising
      i. a top surface having a second hook extending upward therefrom, said second hook and said top surface defining a channel capable of receiving a portion of said cable,
      ii. a bottom surface having at least one nub protruding therefrom, said nub being capable of being received at least partially within said base member slot, and,
      iii. a front portion and front edge and a rear portion and rear edge, said front portion being wider than said rear portion,
   wherein said first retaining arms are capable of engaging a portion of said top member.

2. The clip of claim 1, wherein said top member and said base plate are engageable so as to removably secure an edge portion of said sheet therebetween when said top member and said base plate are in an engaged relationship, and wherein said top member channel can receive a portion of a cable and wherein said at least one nub is slidingly engaged within said at least one slot.

3. The clip of claim 1, wherein at least a portion of said top member tapers from said front portion to said rear portion.

4. The clip of claim 1, wherein said base plate bottom surface has a portion proximate to said front edge which angles upward toward said top surface.

5. The clip of claim 1, wherein said at least one nub, when positioned within said at least one slot, permits limited movement of said top member with respect to said base plate so that said sheet may be either engaged or disengaged without said top member and said base plate fully separating.

6. The clip of claim 1, wherein said top plate is sized to engage said base plate first retaining arms and at least a portion of said base plate top surface so as to form a friction fit.

7. The clip of claim 1, wherein each said nub has a beveled front edge and a generally vertical rear edge.

8. The clip of claim 1, further comprising a plurality of posts extending from said bottom surface of said base member, said plurality of posts spaced to co-operate with said first hook to retain a portion of said cable.

9. The clip of claim 1, wherein said base plate gripping surface comprises a plurality of raised portions.

10. The clip of claim 1, wherein said first hook has a distal end including a bump to reduce the size of the opening between said top member and said first hook.

11. The clip of claim 1, wherein said first hook has a distal end having beveled corners.

12. The clip of claim 1, wherein said first hook has a distal end including a bump to reduce the size of the opening between said base plate and said first hook.

13. The clip of claim 1, wherein said first hook comprises a plurality of spaced apart, generally parallel fingers, each finger having a channel defined therein substantially coplanar with one another for receiving a portion of said cable.

14. A clip usable in a cable tensioning system for engaging and removably retaining a portion of a sheet to be stretched, comprising:
   a. a base plate comprising
      i. a generally flat base member having
         1) a top surface comprising a front portion having a gripping surface and a rear portion,
         2) a pair of opposing first arms extending upward from said top surface, each first arm having an angled portion angled toward the other arm, said first arms capable of engaging a portion of a cable;
         3) a bottom surface having a hook extending therefrom, said hook having a channel defined therein capable of receiving a portion of a cable,
         4) a front edge and a rear edge, and
         5) at least one slot formed in said base member; and,
   b. a top member comprising
      i. a top surface,
      ii. a bottom surface having at least one nub protruding therefrom, said nub being capable of being received at least partially within said base member slot, and,
      iii. a front portion and front edge and a rear portion and rear edge, said front portion being wider than said rear portion.

* * * * *